Figure 1:
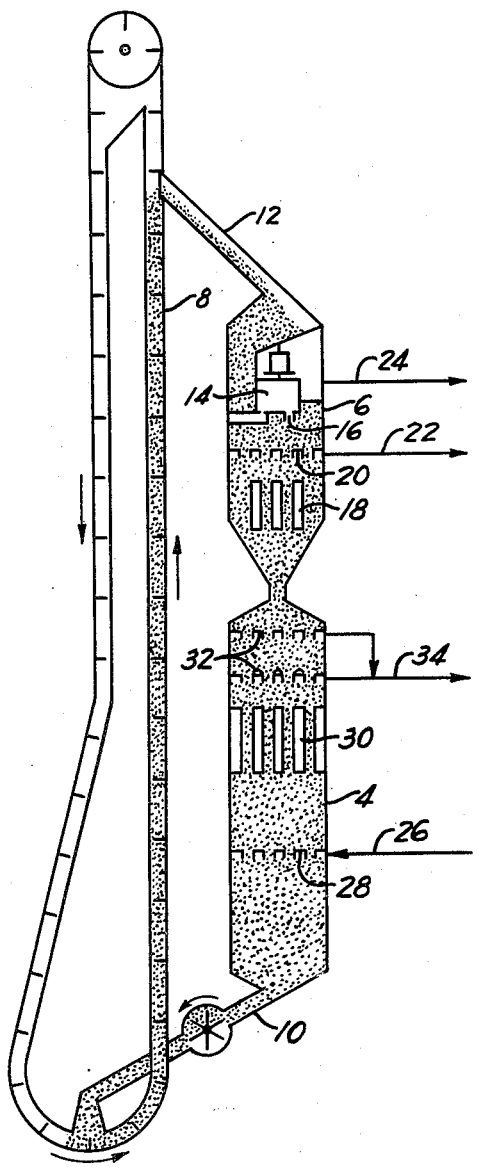

Dec. 9, 1958   A. M. HENKE ET AL   2,863,829
PROCESS AND APPARATUS FOR SELECTIVE ADSORPTION
Filed Aug. 9, 1956

INVENTORS
ALFRED M. HENKE
ALLEN E. SOMERS
BY

THEIR ATTORNEY

United States Patent Office 2,863,829
Patented Dec. 9, 1958

2,863,829

PROCESS AND APPARATUS FOR SELECTIVE ADSORPTION

Alfred M. Henke, Springdale, and Allen E. Somers, Aspinwall, Pa., assignors to Gulf Research & Development Company, Pittsburgh, Pa., a corporation of Delaware Application August 9, 1956, Serial No. 603,066

3 Claims. (Cl. 210—26)

This invention relates to improved procedure and apparatus for separation of components of a mixture by selective adsorption and particularly to the separation of one or more components of a liquid mixture by selective adsorption.

In United States Patent 2,631,727, March 17, 1953, Cichelli, improved adsorption process and apparatus is described in which particles of a solid adsorbent are contacted with a liquid mixture. One of the components is selectively adsorbed. The adsorbent bearing the adsorbed component is elevated and introduced into a desorbing zone in which the occluded liquid is first removed by heating to a moderate temperature and the adsorbed component is then removed by heating to a higher temperature. The adsorbent is then cooled by quenching in unadsorbed liquid and re-used.

This invention has for its object to provide improved procedure for carrying out the above described selective adsorption process. Another object is to provide improved apparatus for carrying out selective adsorption of a component from a liquid mixture followed by desorbing with heat. Another object is to provide improved procedure for removing occluded liquid during a selective adsorption process without causing vaporization of adsorbed component. A still further object is to provide improved procedure for removing adsorbed liquid from a solid adsorbent. Still another object is to provide an improved combination of operations comprising separating occluded liquid, elevating solid particles freed of occluded liquid and for removing adsorbed component. Other objects will appear hereinafter.

These and other objects are accomplished by our invention which includes apparatus and process for continuously contacting a liquid feed mixture which is to be separated by selective adsorption with adsorbent particles in countercurrent flow, subjecting the adsorbent particles after they have thus been contacted with the feed mixture to centrifugal force to remove occluded liquid, heating the centrifuged adsorbent particles to remove adsorbed component and re-using the adsorbent particles. Our invention also includes improved procedure for desorbing adsorbent particles containing adsorbed liquid by suspending them in a heated gas or vapor so as to form a fluidized dense phase of solid particles and an upper fluidized light phase of solid particles. This aspect of our invention is applicable to the desorption of solid particles utilized to separate components of any liquid mixture in any type of adsorption process of a continuous or discontinuous nature.

In the following examples and description we have set forth several of the preferred embodiments of our invention, but it is to be understood that they are given by way of illustration and not in limitation thereof.

Figure 2:
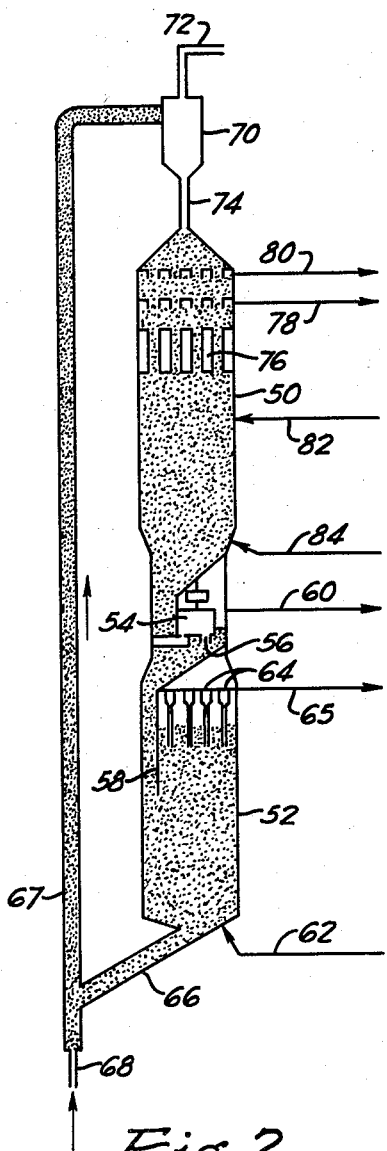

In the accompanying drawings we have illustrated improved apparatus constituting the subject matter of our invention. Figure 1 is a sectional elevation of our improved apparatus illustrating the manner in which occluded liquid may be removed, and Figure 2 is a sectional elevation illustrating apparatus in which our improved process utilizing centrifugal force to remove occluded liquid and a fluidized bed of particles for desorbing may be carried out.

Referring to Figure 1, numeral 4 designates an elongated cylindrical adsorbing section or zone, and numeral 6 a superimposed cylindrical desorbing section, while numeral 8 designates an elevating mechanism for elevating solid particles which flow from the base of adsorbing section 4 through conduit 10 into the lower portion of elevator 8. Numeral 12 designates a conduit for delivering elevated solid particles into the intake side of centrifuge 14. Numeral 16 designates the exhaust side of centrifuge 14. Numeral 18 indicates a series of heating elements, preferably heated by circulation of heated gas or vapor such as steam therethrough, and numeral 20 designates a perforated collecting header connected with withdrawal conduit 22. Numeral 24 designates a conduit connected to the exhaust side of centrifuge 14 from which liquid is removed.

Referring to adsorption section 4, numeral 26 designates a conduit for introducing the feed mixture to be separated into adsorber 4 through perforated header 28 connected thereto. Numeral 30 designates a series of hollow cooling elements which are cooled by circulation of a cooling liquid such as water therethrough. Numeral 32 designates perforated headers positioned in adsorber 4 which are connected to conduit 34 for removal of unadsorbed product.

The operation of the apparatus illustrated in Figure 1 may be described in connection with the separation of ethanol from an azeotropic mixture containing 37 percent by weight ethanol and 63 percent by weight methyl ethyl ketone using silica gel as the adsorbent. This mixture boils at 74.8° C. at 760 mm. Hg and is encountered in the separation and purification of the oxygenated products from the Fischer-Tropsch synthesis. This mixture is charged to adsorbing section 4 through conduit 26 at a rate such that the adsorbent to feed ratio is approximately 1:1. The feed should enter at a temperature between 60° and 100° F. and cooling medium should be circulated in coils 30 to kep the adsorbent in this section about 10° to 50° below the feed temperature in order to counteract the heat of wetting. Unadsorbed liquid is removed through conduit 34. At the feed rate given it is probable that there will not be excess unadsorbed liquid but at higher feed rates such excess liquid would be present and would be removed through conduit 34. The adsorbed and occluded liquid and the solid silica gel particles flowing through conduit 10 are elevated by elevator 8 and flow into centrifuge 14 where the occluded and unadsorbed liquid is removed by centrifugal force and discharged through conduit 24 as substantially pure methyl ethyl ketone. The silica gel carrying the adsorbed ethanol then flows over heating elements 18 where the adsorbent is heated by elements 18 to desorbing temperature. The desorbed ethanol vapor is removed through conduit 22. The temperature of this section should be in the range of 300° to 400° F. The desorbed adsorbent then flows into the upper portion of section 4 and thence over cooling elements 30.

Referring to Figure 2, numeral 50 designates a cylindrical adsorbing section superimposed upon a cylindrical desorbing section 52. Numeral 54 designates a centrifuge positioned intermediate adsorbing and desorbing zones 50 and 52. The intake side of the centrifuge is connected to adsorbing section 50, and the exhaust side for solid particles 56 is connected to the upper part of desorber 52. The solids passing from the exhaust side 56 flow through a downcomer 58 into the dense phase of solid particles in the lower portion of desorber 52. Numeral 60 designates a conduit for removal of occluded liquid separated in centrifuge 54. Numeral 62 designates a conduit for introducing a heated carrier gas or vapor such as steam into the lower portion of desorber 52 while numeral 64 designates a plurality of cyclone separators adapted to separate solid particles from gas or vapor. These solid particles are returned to desorber 52 while the separated gas freed of solid particles is removed through conduit 65. Numeral 66 designates a conduit connected to the lower portion of desorber 52 and serves to deliver solid particles to a vertical gas lift 67.

Gas lift 67 is provided at its lower end with a conduit 68 for injection of lifting gas. This gas entrains the solid particles and carries them to the upper end of gas lift 67 which is provided with a cyclone separator 70 in which the solid particles are separated from the lift gas. The separated gas is removed at 72 and the solid particles flow through conduit 74 into the upper end of adsorber 50.

Means for cooling solid particles entering the top of adsorber 50 have been illustrated in the drawing. However, such means may not be necessary in many cases since cooling of the adsorbent may take place to a sufficient extent in gas lift 67. These cooling elements are indicated by numeral 76. Conduit 78 indicates means for removing unadsorbed liquid. Conduit 80 is provided for removing unadsorbed vapors formed when heated solid particles contact the unadsorbed liquid in the top of adsorber 50. Numeral 82 designates a conduit for introducing feed into adsorber 50. Numeral 84 designates a conduit which may be used to introduce a gas which may be cooled and thus effect cooling of the adsorbent. However, this gas may be used solely for partly suspending the solid particles to increase adsorption. This partial suspension is obtained by introducing the gas at a rate which expands the bed of solid particles but which is below the rate which causes fluidization or random motion of the solid particles.

In operating the apparatus illustrated in Figure 2, the liquid mixture to be separated is led through conduit 82 into adsorber 50 which is filled with a body of solid particles which are in a relatively compact column. These solid particles are traveling downwardly and the feed travels upwardly so that the two are contacted countercurrently. One of the components of the feed will become adsorbed on the solid particles. Also some occluded liquid will be retained thereon. These solid particles bearing adsorbed component and occluded liquid are introduced into the intake of centrifuge 54. Unadsorbed liquid travels upwardly and is removed through conduits 78 and 80.

In centrifuge 54 the solid particles are separated from the adherent or occluded liquid by centrifugal force. This liquid is removed through conduit 60 while the dried solid particles are ejected through exhaust port 56 and flow downward through downcomer 58 into the dense phase of fluidized solid particles in desorber 52.

A hot gas or vapor is introduced through conduit 62 at such a rate and in such volume as to maintain the solid particles in desorber 52 in a fluidized state and so that the lower portion of this fluidized bed of solid particles is in a dense phase while the upper portion is in the form of a light phase. The fluidizing gas passes through cyclone separator 64 where entrained solid particles are removed and returned to desorber 52. The gas is removed through conduit 65. During passage of the heated fluidizing gas through desorber 52 the solid particles are efficiently heated by intimate contact therewith to a temperature such that the adsorbed component is removed in the form of vapor or gas. This desorbed component also passes through cyclones 64 and conduit 65 and is separated from the heating gas by condensation or other suitable means.

Solid particles freed of adsorbed liquid then pass through conduit 66 into the lower end of gas lift 67 where they are forced by a stream of gas issuing through conduit 68 to the top of lift 67 where the solid particles are separated and flow via conduit 74 into the top of adsorber 50. Where cooling elements are necessary, the solid particles flow over cooling unit 76 and are then again contacted with the feed mixture in adsorber 50. Any vapor produced by contact between solid particles and unadsorbed liquid is removed from the upper part of desorber 50 through conduit 80 while unadsorbed liquid is removed through conduit 78.

It will be apparent that the liquid mixture to be separated need not be a mixture which is liquid under normal conditions. Thus the invention is applicable to treatment of a mixture which is liquid or substantially liquid under the conditions of treatment. Carrying out the process under pressure will enable the processing of mixtures which are normally gaseous.

The desorbing section 52 illustrated in Figure 2 constitutes an improved method of desorbing adsorbed liquid which has been adsorbed in any type of adsorbing unit. Therefore, this specific aspect of our invention is not limited in use to the centrifugal separation of occluded liquid or to a continuous process wherein components of a liquid mixture are separated.

The centrifuge utilized to separate occluded liquid is of a type designed to take a wet mass of solid particles or a slurry of solid particles into the intake side and to deliver dry solid particles and separated liquid or gas as separate streams at the exhaust side. Centrifuges for handling such slurries and accomplishing such separations are known in the prior art and do not constitute a part of this invention.

Our invention may be used to separate components of any liquid mixture containing at least two components one of which has a higher adsorbability than the other. Thus the invention may be used to separate a paraffin-aromatic hydrocarbon mixture such as a mixture of normal hexane and benzene; a naphthene-aromatic hydrocarbon mixture such as methylcyclohexane-toluene; a paraffin hydrocarbon mixture such as ethane-propane; an olefin-diolefin hydrocarbon mixture such as a mixture of 2-methyl-butene-2 and isoprene; an olefin-aromatic hydrocarbon mixture such as heptenes-toluene; a paraffin-naphthene hydrocarbon mixture such as normal heptane-methyl-cyclohexane; an alcohol-ester mixture such as ethanol-ethyl acetate; an alcohol-ketone mixture such as butanol-2-methylethylketone; an acidic compound-hydrocarbon mixture such as phenol-benzene; an aldehyde-ketone mixture such as propionaldehyde-methyl ethyl ketone; or an acid gas-hydrocarbon mixture such as hydrogen sulfide-methane. If there are more than two compounds in the mixture, a plurality of adsorption columns may be utilized. In such case one component may be adsorbed and two or more components remain unadsorbed. The unadsorbed components would then be treated in a separate adsorption system where the operation would be repeated. If more than one component is adsorbed in the first stage, both components of the mixture may be desorbed simultaneously and subsequently separated in another adsorption column. Alternatively the desorption may take place in stages so that the most easily desorbed material would be removed first. When using this multi-stage desorption operation, the apparatus of Figure 1 would not require extensive modifications except for addition of more heating zones and elongation of the desorbing zone. The apparatus of Figure 2 would necessitate separate desorbing zones, each operating at different temperatures. It will also be apparent that separation of the components can be improved by return of reflux from the desorbing column to the adsorbing column.

Any selective adsorbent may be used. Examples of suitable adsorbents are alumina, bauxite, silica gel, alumina gel, synthetic chabazite, active carbon and fuller's earth.

We claim:

1. A continuous process for separating a liquid mixture by selective adsorption which comprises causing a body of solid adsorbent particles to flow continuously through adsorption, centrifugal and desorption zones, introducing a liquid feed mixture into the adsorption zone in countercurrent flow to the adsorbent particles whereby a portion of the feed mixture is adsorbed by and carried with said adsorbent particles to be recovered as adsorbed product rich in one component of the feed mixture and another portion of the feed mixture passes through said adsorbent particles to be recovered as non-adsorbed product rich in another component of the feed mixture, subjecting the adsorbent particles after they have been thus contacted with the feed mixture to centrifugal force to remove occluded liquid, introducing the centrifuged solid adsorbent partices into the desorption zone, heating the centrifuged adsorbent particles as they pass through the desorption zone to vaporize the adsorbed component, continuously withdrawing the vaporized adsorbed material from the desorption zone as the adsorbed product, and introducing the adsorbent particles freed of occluded and adsorbed material into contact with additional feed mixture in the adsorption zone.

2. A continuous process for separating a liquid mixture by selective adsorption which comprises causing a body of solid adsorbent particles to flow continuously downwardly by gravity through an adsorption zone and a desorption zone therebelow, continuously introducing a liquid feed mixture into said adsorption zone in upward flow countercurrently to the flow of adsorbent particles whereby a portion of the feed mixture is adsorbed by and carried downwardly with said adsorbent particles to be recovered as adsorbed product rich in one component of the feed mixture and another portion of the feed mixture passes upwardly through said adsorbent particles to be recovered as non-adsorbed product rich in another component of the feed mixture and an occluded liquid mixture intermediate in composition between the adsorbed and non-adsorbed portions of the feed mixture being also carried downwardly with the adsorbent particles, subjecting the adsorbent particles bearing adsorbed and occluded portions of the liquid feed mixture and removed from the lower end of the adsorption zone to centrifugal force to remove said occluded portions of the liquid feed mixture, introducing the centrifuged adsorbent particles into the desorption zone, introducing a fluidizing or suspending heated gas into the desorption zone whereby the centrifuged adsorbent particles are suspended in the gas and heated to a temperature sufficient to vaporize the adsorbed component, continuously withdrawing the vaporized adsorbed component from the desorption zone, introducing the adsorbent particles freed of occluded liquid into an upwardly flowing current of gas for elevating said particles of adsorbent, and introducing said elevated particles into the adsorption zone positioned above the desorption zone.

3. Liquid separation apparatus for continuously separating a liquid mixture by selective adsorption which comprises in combination an adsorption section in which a liquid feed mixture is flowed countercurrently to solid adsorbent particles by gravitational force, a desorption section positioned below the adsorption section in which adsorbed organic material is thermally desorbed from adsorbent particles passing therethrough, a centrifuge for solid adsorbent particles adapted to remove occluded liquid therefrom by centrifugal force, means for providing continuous flow of solid adsorbent particles through the adsorption section to the inlet of the centrifuge, means for providing continuous flow of solid particles from the outlet of the centrifuge to the desorption section, means for introducing a heated fluidizing gas into the lower portion of the desorption section, means positioned at the upper portion of the desorption section for separating fluidizing gas from the adsorbent particles, a gas lift for solid particles, means for introducing desorbed solid particles from the desorption section into the lower end of the gas lift, means for introducing elevating or lifting gas into the bottom of the gas lift, means positioned at the upper end of the gas lift for separating elevated solid particles from the elevating gas, means for introducing elevated solid particles into the upper end of the adsorption section, means for introducing feed into the adsorption section, means for removing unadsorbed portion of feed mixture from the adsorption section and means for removing selectively adsorbed product from the desorption section.

References Cited in the file of this patent

UNITED STATES PATENTS

| | | |
|---|---|---|
| 2,564,532 | Hirschler | Aug. 14, 1951 |
| 2,626,675 | Maher | Jan. 27, 1953 |
| 2,631,727 | Cichelli | Mar. 17, 1953 |
| 2,701,786 | Evans | Feb. 8, 1955 |
| 2,748,064 | Myers | May 29, 1956 |